(12) United States Patent
Sato et al.

(10) Patent No.: US 7,541,766 B1
(45) Date of Patent: Jun. 2, 2009

(54) SYSTEM AND METHOD FOR THE INTELLIGENT USE OF SOFTWARE DEADBAND CONTROL IN A CONTROL SYSTEM

(76) Inventors: Jeffrey S. Sato, 8874 S. Powderhorn Dr., Sandy, UT (US) 84093; Jeffrey J. McGill, 3889 Midland Dr., West Haven, UT (US) 84401; Timothy G. Riggs, 1931 W. 4960 S., Taylorsville, UT (US) 84118; Stephen R. Silver, 570 E. Commonwealth Ave., Salt Lake City, UT (US) 84101

( * ) Notice: Subject to any disclaimer, the term of this patent is extended or adjusted under 35 U.S.C. 154(b) by 353 days.

(21) Appl. No.: 11/067,850

(22) Filed: Feb. 28, 2005

Related U.S. Application Data

(60) Provisional application No. 60/575,862, filed on Jun. 1, 2004.

(51) Int. Cl.
*G05B 11/01* (2006.01)

(52) U.S. Cl. .................. 318/630; 318/575; 318/632; 700/29; 700/282; 701/41

(58) Field of Classification Search ............... 318/575, 318/611, 630, 632, 633; 343/882, 757, 766, 343/763, 765; 700/29, 282; 701/41
See application file for complete search history.

(56) References Cited

U.S. PATENT DOCUMENTS

| | | | | |
|---|---|---|---|---|
| 3,241,015 A * | 3/1966 | Allen | .......... | 318/615 |
| 3,701,992 A * | 10/1972 | Allen | .......... | 346/32 |
| 3,821,625 A * | 6/1974 | Scholl | .......... | 318/624 |
| 4,072,886 A * | 2/1978 | Dammeyer | .......... | 318/602 |
| 4,259,626 A * | 3/1981 | Nomura et al. | .......... | 318/599 |
| 5,015,934 A * | 5/1991 | Holley et al. | .......... | 318/611 |
| 5,021,941 A * | 6/1991 | Ford et al. | .......... | 700/71 |
| 5,227,806 A * | 7/1993 | Eguchi | .......... | 343/765 |
| 6,195,060 B1 * | 2/2001 | Spano et al. | .......... | 343/766 |
| 6,285,339 B1 * | 9/2001 | McGill | .......... | 343/882 |
| 6,317,093 B1 * | 11/2001 | Harris | .......... | 343/765 |
| 6,326,758 B1 * | 12/2001 | Discenzo | .......... | 318/609 |
| 6,373,447 B1 * | 4/2002 | Rostoker et al. | .......... | 343/895 |
| 6,427,104 B1 * | 7/2002 | Matsushita et al. | .......... | 701/41 |
| 6,677,896 B2 * | 1/2004 | Singer et al. | .......... | 342/359 |
| 6,961,637 B2 * | 11/2005 | Scherer | .......... | 700/173 |
| 2002/0008487 A1 * | 1/2002 | Ichikawa | .......... | 318/560 |
| 2003/0201747 A1 * | 10/2003 | Chaffee | .......... | 318/630 |
| 2003/0216820 A1 * | 11/2003 | Messina | .......... | 700/56 |
| 2004/0252067 A1 * | 12/2004 | Royalty | .......... | 343/757 |
| 2005/0000351 A1 * | 1/2005 | Gast | .......... | 91/532 |
| 2005/0278683 A1 * | 12/2005 | Roesner et al. | .......... | 716/18 |
| 2006/0100723 A1 * | 5/2006 | Sun et al. | .......... | 700/61 |
| 2006/0108961 A1 * | 5/2006 | Takemori et al. | .......... | 318/575 |
| 2006/0166681 A1 * | 7/2006 | Lohbihler | .......... | 455/456.2 |
| 2006/0186845 A1 * | 8/2006 | Terada et al. | .......... | 318/432 |

* cited by examiner

*Primary Examiner*—Bentsu Ro
*Assistant Examiner*—Antony M Paul

(57) ABSTRACT

In accordance with one embodiment of the invention a control system for controlling performance of a device is provided. The control system includes a controller system and a deadband compensator connected to the controller. The deadband compensator compensates for error performance of the device while the device is in a static mode. The control system also includes a detector connected to the controller and is adapted to detect or determine movement of the device. If movement is detected or determined the deadband compensator is turned off or otherwise disengaged.

13 Claims, 3 Drawing Sheets

SYSTEM AND METHOD FOR THE INTELLIGENT USE OF SOFTWARE DEADBAND CONTROL IN A CONTROL SYSTEM

Priority is herewith claimed under 35 U.S.C. §119(e) from copending provisional patent application 60/575,862, filed Jun. 1, 2004, entitled "System and Method for the Intelligent Use of Software Deadband Control in a Control System", by Jeffery S. Sato, Jeffery J. McGill, Timothy G. Riggs, and Stephen R. Silver. The disclosure of said provisional patent application is incorporated by reference in its entirety.

BACKGROUND

1. Field of Use

These teachings relate generally to control systems and more particularly to the intelligent use of software deadband control in a control system to remove unwanted limit-cycling in a closed loop control system when the system is in a static position mode.

2. Description of Prior Art (Background)

A power transmission mechanism is often provided between a driving source and a driven member. Especially when position control is performed on a driven member (a load), which has relatively large inertia such as multi-axis positioning equipment. A power transmission mechanism such as a gear train connects a motor serving as a driving source to a load in many cases in consideration of the efficiency, arrangement and the like of the motor. This is often the case with a DC motor used as the driving source since high efficiency is achieved in driving at a high speed.

The power transmission mechanism generally involves a so-called mechanical dead band (hereinafter referred to as "play") such as backlash and rattle in a gear train. When a position detector, such as a rotary encoder is directly connected to the load, this is generally referred to as a closed control system. A control system is likely to operate in an unsteady state due to the play in the gear train or the like. Also, the encoder may need to operate at a high frequency to provide a required resolution, thereby causing a higher cost to manufacture and operate. To avoid these situations, a position detector is often connected to the motor shaft.

Many known constructions of positioners, such as elevation-over-azimuth, two-axis positioners use small, high-speed electric motors with gear-trains to drive the low-speed output axes. Gear-trains have a major disadvantage-backlash, or deadband control. Excessive backlash can cause problems with stability in a closed-loop control system, and backlash adds to position error.

An example of where the deadband control problem is accentuated is in elevation-over-azimuth, two-axis positioners in which the position of the elevation axis is determined by the position of the elevation drive in the base relative to the position of the azimuth drive in the base have a major disadvantage. This is that any backlash in the azimuth drive would add to the backlash in the elevation drive, increasing the total backlash at the elevation output axis.

Direct drive electric motors have been used to eliminate backlash. They generally require more size, mass, and input power than a small, high-speed motor with a gear train for a given output power with a slow-moving output axis.

Various techniques and stabilizaton control methods are known in the art. For example, compensation filters, such as Proportional-Integral-Derivative control (hereinafter referred to as "PID control" and, Proportional, Integral, and Derivative are abbreviated as "P," "I," and "D," respectively) are often used due to readiness of design and adjustment. Other compensation filters could include: lead, lag, lead/lag, and other types of suitable filters.

As described above, the power transmission mechanism has play therein. For example, when the power transmission mechanism is used to drive a member which has a relatively large inertia the play is increased. In consideration of a deviation caused by the play, it is desirable that the power from the driving source to the driven member are not separated due to play in the power transmission mechanism, or otherwise disengaged from each other immediately before the driving source stops in order to enhance the accuracy at the stop position of the driven member.

When such a driving system is subjected to position control through the, for example, PID control, in the semi-closed system, vibrations may easily occur if a high integral gain is used to seek quick elimination of the deviation of the actual driving position of the motor from the target position obtained from a speed table or position sensor.

Many methods have been used for control of backlash in gear trains. George W. Michalec's book Precision Gearing: Theory and Practice, published in 1966, has a good description of many different methods. Most have disadvantages such as increased size, weight, and cost. Examples are split, spring-loaded scissor gears and the use of auxiliary gear trains. However, spring-loaded methods tend to reduce gear life by causing excess wear and material fatigue. Typically, the higher the spring load the shorter the gear life.

Another typical dead band control practice known in the art is to form an error term, which is the point command minus the feedback position data. When the error term gets below a threshold value, the term is set to zero. In a type I or type II closed loop system with backlash, setting the term to zero prevents the system from moving back-and-forth, i.e., jittering, in the backlash zone of the gearing system, which is a form of limit-cycling. Setting the error term to zero prevents limit cycling. This lessens the wear and tear on the servo-controlled system.

However, when tracking a moving, i.e., changing or non-static, point command, the servo-controlled gearing is "pushing" to one side of the backlash zone, against the gear face, while at the same time, the servo controller is generating control signals attempting to reduce the error term to zero, or at least below the threshold value. It will be appreciated that setting the threshold to zero when the threshold is passed while the point command is changing and the gear train is dynamic will induce jitter that is a mechanical disadvantage. It will be appreciated that jitter can cause excess wear and tear on the gearing system and increase the amount of tracking error. It will also be appreciated that to compensate for these mechanically induced errors the tolerances associated with manufactured parts be as small as possible. Achieving such tolerances are difficult and expensive to maintain.

BRIEF SUMMARY

As will be described below, important aspects of the invention reside in the intelligent use of deadband control in a controlled system.

In accordance with one embodiment of the invention a control system for controlling performance of a device is provided. The control system includes a controller system and a deadband compensator connected to the controller. The deadband compensator compensates for error performance of the device while the device is in a static mode. The control system also includes a detector connected to the controller and is adapted to detect or determine movement of the device.

If movement is detected or determined the deadband compensator is turned off or otherwise disengaged.

In accordance with another embodiment the invention includes a method for deadband control in a control system. The method includes determining a deadband zone error term and determining a point command vector. If the point command vector is static and the deadband zone error term is greater than a predetermined amount then the method engages a deadband controller responsive to determining the deadband zone error term and the point command vector.

Another embodiment of the invention is directed to an integrated circuit (IC), wherein the IC includes a controller system and a deadband compensator connected to the controller, the first deadband compensator compensating for error performance of the device; and a detector adapted to detect movement of the device.

The invention is also directed towards a program storage device readable by a machine, tangibly embodying a program of instructions executable by the machine to perform method steps for deadband control in a control system. The method includes determining a deadband zone error term; determining a point command vector; and engaging a deadband controller responsive to determining the deadband zone error term and the point command vector.

DETAILED DESCRIPTION

Positioners employing multi-axis gimbal mounts are widely used for positioning antennas, optical sensors, scientific and medical instruments, bio-feedback systems for maintaining medication dosage, lasers, weapons, and other such devices.

Gimbal mounts provide relative ease of movement so that, for example, a gimbal-mounted satellite antenna may be positioned to track a fixed target on earth as the satellite drifts by overhead or to track another satellite antenna. As the target moves relative to the gimbal-mounted antenna, the antenna is moved to maintain the target within the antenna's relatively narrow beam. To be effective especially over long distances this positioning must be precise and stable.

However, all known systems are generally susceptible to backlash, manufacturing complexity, and wear. Backlash and friction uncertainties can greatly complicate the design of an associated position control system.

Figure 1:
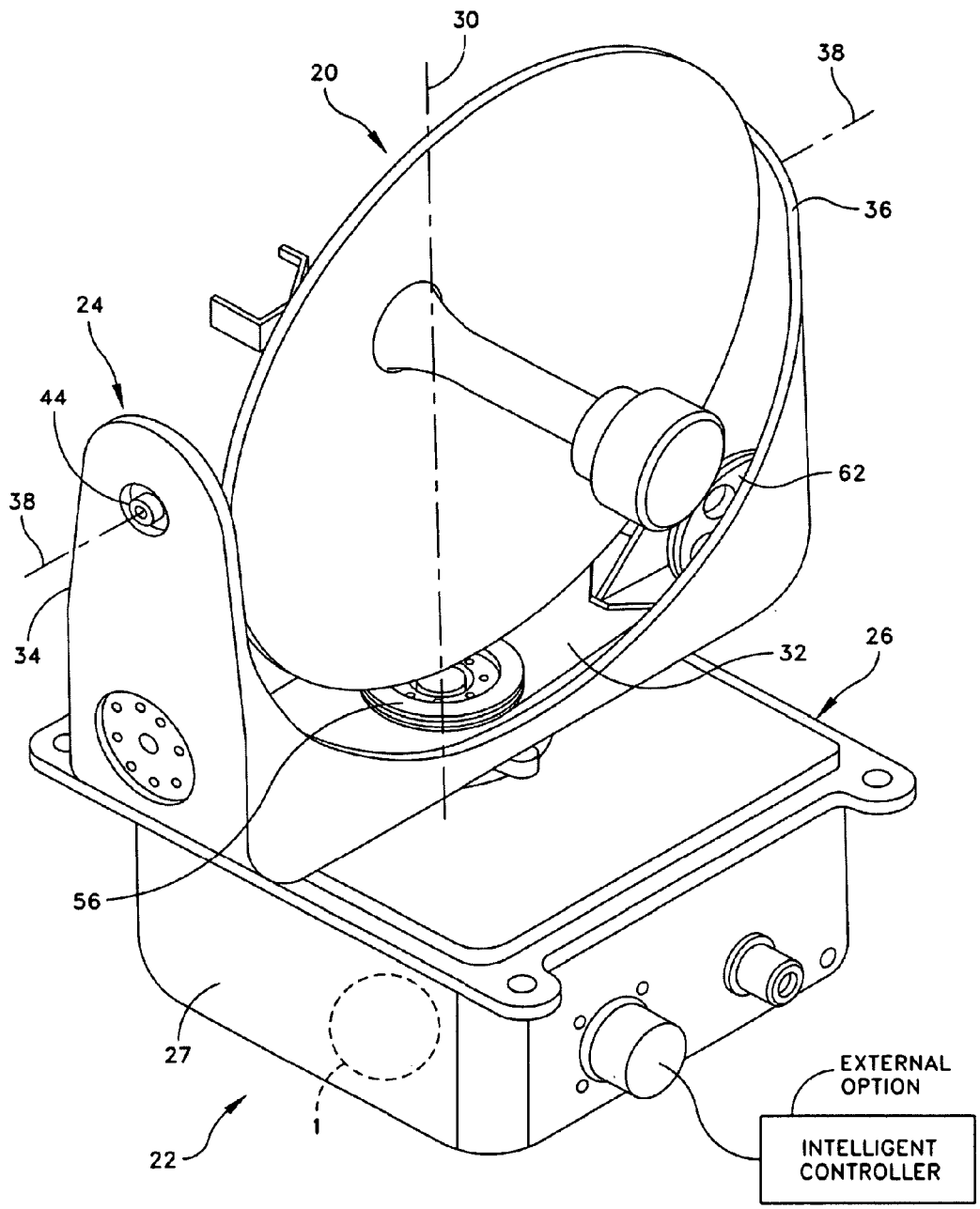
FIG. 1 is a perspective view of an antenna in combination with a two-axis positioning apparatus embodying the present invention.

Referring initially to FIG. 1, there is shown a perspective view of a load, here illustrated as an antenna 20, and two-axis positioning apparatus 22 incorporating features of the present invention. Although the present invention will be described with reference to embodiments shown in the drawings, it should be understood that the present invention can be embodied in many alternative embodiments. In addition, any suitable size, shape or type of elements or materials could be used. Further, the positioning apparatus 22 may be used in combination with a wide range of controlled devices other than an antenna such as, but not limited to, optical sensors, scientific instruments, lasers, facsimile machines, and weapons.

The positioning apparatus 22 includes a support member, or yoke, 24 mounted on a base 26 to which is attached a housing 27 containing intelligent controller 1 and other various drive components for positioning the apparatus. Optionally, as shown in FIG. 1, in alternate embodiments, intelligent controller 1A may be located external and suitably connected to the controlled device. It will be further appreciated that intelligent controller 1, or 1A, may be an integrated circuit (IC).

Figure 2:
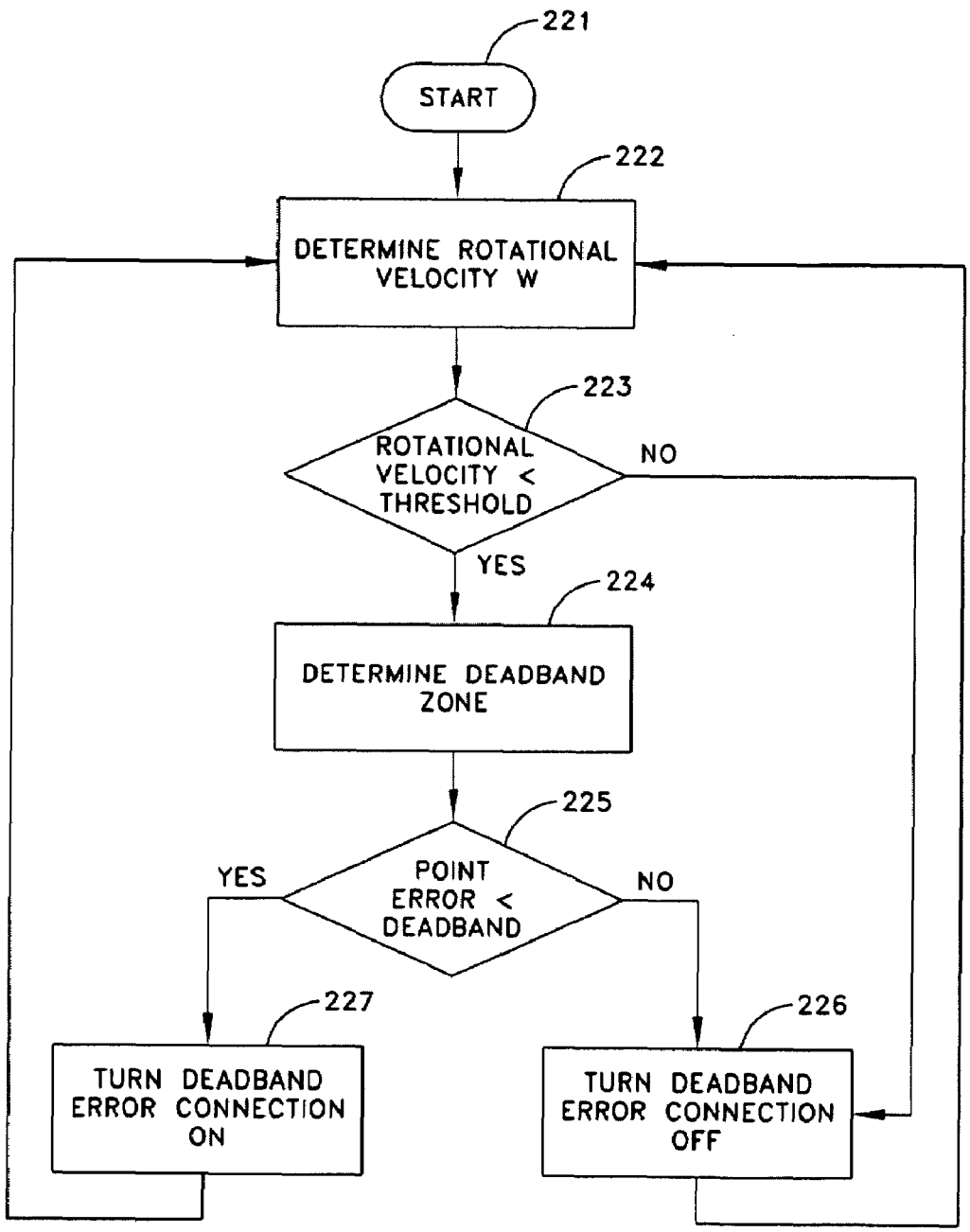
FIG. 2 is a flowchart of one method for controlling deadband in accordance with teachings of the present invention shown in FIG. 1.
Figure 3:
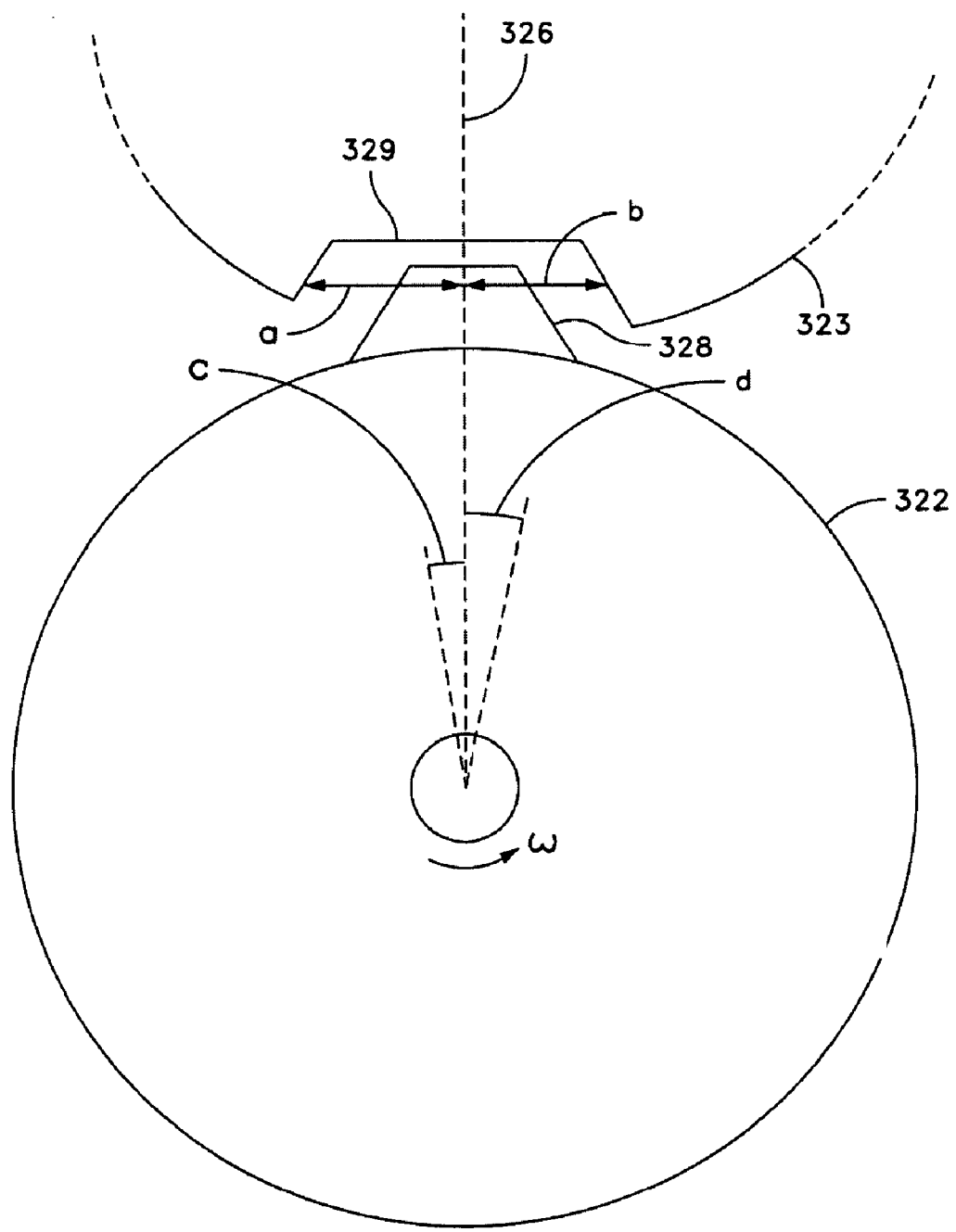
FIG. 3 is a pictorial of a gear showing a deadband zone controlled in accordance with teachings of the present invention shown in FIG. 2 and FIG. 1.

Referring also to FIG. 2 there is shown a flowchart of one method for controlling deadband in accordance with teachings of the present invention shown in FIG. 1; and referring also to FIG. 3 there is shown a pictorial of a gear showing a deadband zone controlled in accordance with teachings of the present invention shown in FIG. 2 and FIG. 1.

It will be appreciated that in FIG. 3 a single gear tooth is shown for convenience but it will be understood that gear 322 may include a plurality of gear teeth. Still referring to FIG. 3, a driven gear 323 is shown with a recession 329. However it will be understood that driven gear 323 may include a plurality of recessions.

Step 222 determines if the gear has a rotational velocity w. It will be appreciated that step 222 may determine if the gear 322 has rotational position, velocity, acceleration, or "jerk". It will also be appreciated that in alternate embodiments any suitable method for determining position, rotational velocity or acceleration may be used. For example, optical disk encoders or tachometers may be used to detect gear rotation. In a preferred embodiment the motion of the gear 322 and the velocity component of an incoming point command are monitored to determine if it is necessary to turn on the deadband controller.

Step 223 determines if the absolute value of velocity w is less than a predetermined value, i.e., the gear is in static mode. If the gear 322 is in dynamic mode control is passed to step 226.

Otherwise, step 224 determines the parameters of the deadband zone a-b. It will be appreciated that deadband zone a-b can be set to any suitable value. It will be further appreciated that reference line 326 may be rotated to any desirable axis. For example, it may be desirable to compute a deadband zone such that left surface face of gear 328 is in contact or close proximity to the right flank of recession 329.

Step 225 determines if the absolute value of the pointing error is less than the deadband zone a-b, or another predetermined value. If the absolute value of the pointing error term is less than the predetermined value then method control is passed to step 227.

If the absolute value of the pointing error term is greater than the predetermined value then step 226 turns off the deadband error correction and moves gear 328 to desired reference 326. It will be appreciated that desired reference 326 may have a tolerance band as indicated by dashed lines C and D.

It is also readily appreciated from the descriptions above that the disadvantages of the prior art are overcome by the present invention. Specifically, the invention removes unwanted limit cycling in a closed loop control system when gear 322 (FIG. 3) is in a static mode.

Specifically, the invention advantageously monitors the motion of the system and the velocity component of the incoming point command to determine if the deadband controller should be on or off. Thus, preventing limit cycling in the static case, e.g., the point command does not contain a velocity component; yet, allowing the control system to reduce error in the dynamic case, e.g., the point command does contain a velocity component.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

It will be further appreciated that the aforementioned IC may be an application specific IC (ASIC), or a function of firmware. A suitable programming language such as a Very High Speed Integrated Circuit (VHSIC) Hardware Description (VHDL) Language file may define the operation of the ICs or firmware.

What is claimed is:

1. A control system for controlling performance of a device, the control system comprising:
    a controller system;
    a first deadband compensator connectable to the controller system, the first deadband compensator compensating for error performance of the device; and
    a first detector connected to the controller system, wherein the first detector is adapted to detect a point command of the device and wherein the first deadband compensator connects to the controller system to position the device in a predetermined deadband zone when the first detector does not detect a point command, and wherein the first deadband compensator disconnects when the first detector detects a point command.

2. A control system as in claim 1 wherein the device comprises a multi-axis device.

3. A control system as in claim 2 wherein the multi-axis device comprises an antenna system.

4. A control system as in claim 1 wherein the first detector is adapted to detect a point command velocity component.

5. A control system as in claim 1 wherein the first detector is adapted to detect a point command acceleration component.

6. A method for deadband control in a control system, the method comprising:
    determining a deadband zone error term;
    determining a point command; and
    engaging a deadband controller responsive to determining the deadband zone error term and the point command.

7. A method as in claim 6 wherein determining the point command further comprises determining a point command velocity component.

8. A method as in claim 6 wherein determining the point command further comprises determining a point command acceleration component.

9. An integrated circuit (IC), wherein the IC comprises:
    a controller system;
    a first deadband compensator connected to the controller, the first deadband compensator compensating for error performance of the device; and
    a first detector connected to the controller, wherein the first detector is adapted to detect movement of the device.

10. An IC as in claim 9 wherein the IC comprises an Application Specific IC (ASIC).

11. An IC as in claim 9 wherein the IC comprises a field programmable gate array (FPGA).

12. A program storage device readable by a machine, tangibly embodying a program of instructions executable by the machine to perform method steps for deadband control in a control system, the method comprising:
    determining a deadband zone error term;
    determining a point command; and
    engaging a deadband controller responsive to determining the deadband zone error term and the point command.

13. A program storage device as in claim 12 wherein the program of instructions comprise at least one Very High Speed Integrated Circuit (VHSIC) Hardware Description (VHDL) Language file.

* * * * *